United States Patent [19]

Brown et al.

[11] 4,086,764
[45] May 2, 1978

[54] HYDROTURBINE ENGINE DEVICE

[76] Inventors: Steven H. Brown, 3521 E. G. St., Tacoma, Wash. 98404; David C. Walter, 725 N. 60th, Springfield, Oreg. 97477

[21] Appl. No.: 776,906

[22] Filed: Mar. 11, 1977

Related U.S. Application Data

[63] Continuation-in-part of Ser. No. 676,543, Apr. 13, 1976, abandoned.

[51] Int. Cl.$^2$ ............................................. F16D 31/00
[52] U.S. Cl. ................................ 60/325; 60/DIG. 2; 180/66 R; 418/210
[58] Field of Search ................... 60/325, 483, DIG. 2, 60/39.44; 418/210; 180/66 R; 91/411 A; 415/92, 202

[56] References Cited

U.S. PATENT DOCUMENTS

| | | | |
|---|---|---|---|
| 1,068,596 | 7/1913 | Long | 415/92 X |
| 3,379,008 | 4/1968 | Manganaro | 60/408 X |
| 3,582,245 | 6/1971 | Wallace | 60/483 X |
| 3,744,926 | 7/1973 | Hedges | 60/39.44 X |
| 3,948,047 | 4/1976 | Gilbert | 60/325 |

*Primary Examiner*—Edgar W. Geoghegan
*Attorney, Agent, or Firm*—Clarence A. O'Brien; Harvey B. Jacobson

[57] ABSTRACT

A hydroturbine engine device having a plurality of notched discs mounted within a high pressure fluid chamber. A high pressure oil input is provided along the edges of said discs at one portion of the unit and an outlet for the spent oil is provided downstream thereof and adjacent thereto. The discs are keyed to a center driven shaft for connection to a work output. The turbine engine is connected to a high pressure oil pumping unit which supplies oil at high pressure to the input of said turbine engine. The turbine engine is also connected to an electrical alternator which in turn is connected to a storage battery through a voltage regulator system. The storage battery is used to at least partially drive the electric motor for the hydraulic oil pump. Thus, a portion of the energy output of the turbine engine is utilized in a feedback system for the oil pump to partially supply the source of hydraulic oil pressure for the turbine engine.

2 Claims, 7 Drawing Figures

HYDROTURBINE ENGINE DEVICE

CROSS-REFERENCE TO RELATED APPLICATION

The present application is a continuation-in-part of prior application Ser. No. 676,543, filed Apr. 13, 1976, now abandoned.

BACKGROUND OF THE INVENTION

1. Field of the Invention

This invention relates generally to turbine engines of the hydraulic type and related systems therefor. It also involves a feedback system and apparatus therefor in order to conserve energy.

2. Description of the Prior Art

Turbine engines of different types are common in the prior art. However, prior engines of this type utilize complicated valve systems which increase both initial cost and maintenance costs. Prior turbine systems have a further disadvantage in that none of the power output of such devices is conserved, such as by use thereof in a feedback system for supplying at least a portion of the energy necessary to operate the turbine itself. Prior turbine devices are thereby considered to be wasteful. A further difficulty with prior turbine devices which do not employ a feedback system is that, in order to conserve input energy, these devices must be operated at relatively slow speed and low torque.

Cooper, in U.S. Pat. No. 160,944, discloses an example of an early rotary engine driven by steam. No provision is made for recycling of the energy imparted to the device by the steam. Hedges, in U.S. Pat. No. 3,744,926, discloses a more recent rotary device which uses the expansion force of a gas to drive a rotor, the expanding gas being produced by the combustion of gasoline. Besides the high cost of the fuel necessary to drive the Hedges device, difficulty is encountered in sealing and lubricating such a device.

Other turbine devices disclosed in the prior art and which may be pertinent to the present invention are described in the following U.S. patents:

U.S. Pat. Nos. 625,731—H. H. Ames, May 30, 1899
U.S. Pat. No. 701,531—W. F. Bangs, June 3, 1902
U.S. Pat. No. 716,047—C. R. Ingham, Dec. 16, 1902
U.S. Pat. No. 861,277—C. D. Macropoulos, July 30, 1907
U.S. Pat. No. 984,505—J. N. Bosch, Jr., Feb. 14, 1911
U.S. Pat. No. 3,737,248—E. E. Abraham, June 5, 1973.

None of these known prior art devices offers the new and unique features of the invention disclosed herein.

SUMMARY OF THE INVENTION

The present invention provides a turbine engine and associated system therefor which includes a feedback system for the engine itself such that part of the output drive and torque is utilized to provide at least a portion of the input energy to the engine. The present turbine engine is itself of simple construction relative to the turbine and rotary devices of the prior art, thereby providing fabrication cost and maintenance savings. The turbine device of the invention essentially utilizes high-pressure oil directed through a plurality of spaced input nozzles against rotatable driving elements having notches spaced about the periphery thereof, the potential energy in the high pressure oil being converted to kinetic energy in the rotatable driving elements. The oil is vented from the turbine device through outlet ports communicating with pockets between the notches immediately downstream of the input nozzles.

Accordingly, it is an object of the present invention to provide a hydraulic turbine engine which produces greater torque for its size and in relation to the input energy therefor than previous engines of this type.

Another object of the present invention is to provide a hydraulic turbine engine and associated system therefor which includes a feedback system for the device such that part of the output drive and torque is utilized to provide at least a portion of the input force for the engine, thereby allowing the engine to operate at relatively high speed and high torque even though relatively insubstantial load is being applied, the system basically conserving input energy.

A further object of this invention is to provide a hydraulic turbine engine of relatively simple construction and low cost, and which has low maintenance requirements.

A still further object of this invention is to provide a hydraulic engine turbine which will operate for long periods of time without interruption and with minimum necessity for maintenance or repairs.

A still further additional object of this invention is to provide a turbine engine device and system which can be easily constructed and built at relatively low cost, which will have a long useful life, and which substantially conserves energy initially put into the system.

A further object of this invention is to provide a hydraulic turbine engine in combination with hydraulic pump, electrical motor, and alternator components mutually interconnected in a self-regenerating, feedback system, thereby permitting the basic turbine engine to operate at a speed which is most efficient to produce maximum torque and to conserve the greatest amount of input energy.

The hydraulic turbine engine and system disclosed herein has many advantages over known conventional turbine drives and associated systems. A very important advantage of this turbine engine is the simplicity of construction thereof, the low fabrication cost, and the low maintenance required to operate the engine.

Another very important feature is that the engine as associated with the over-all system rotates at an extremely efficient speed to derive maximum output and maximum torque with minimum waste of input energy, these benefits being achieved through the use of an alternator, voltage regulator, storage battery, electric motor, and high pressure hydraulic pump associated with the hydraulic turbine, as will be described in detail below.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
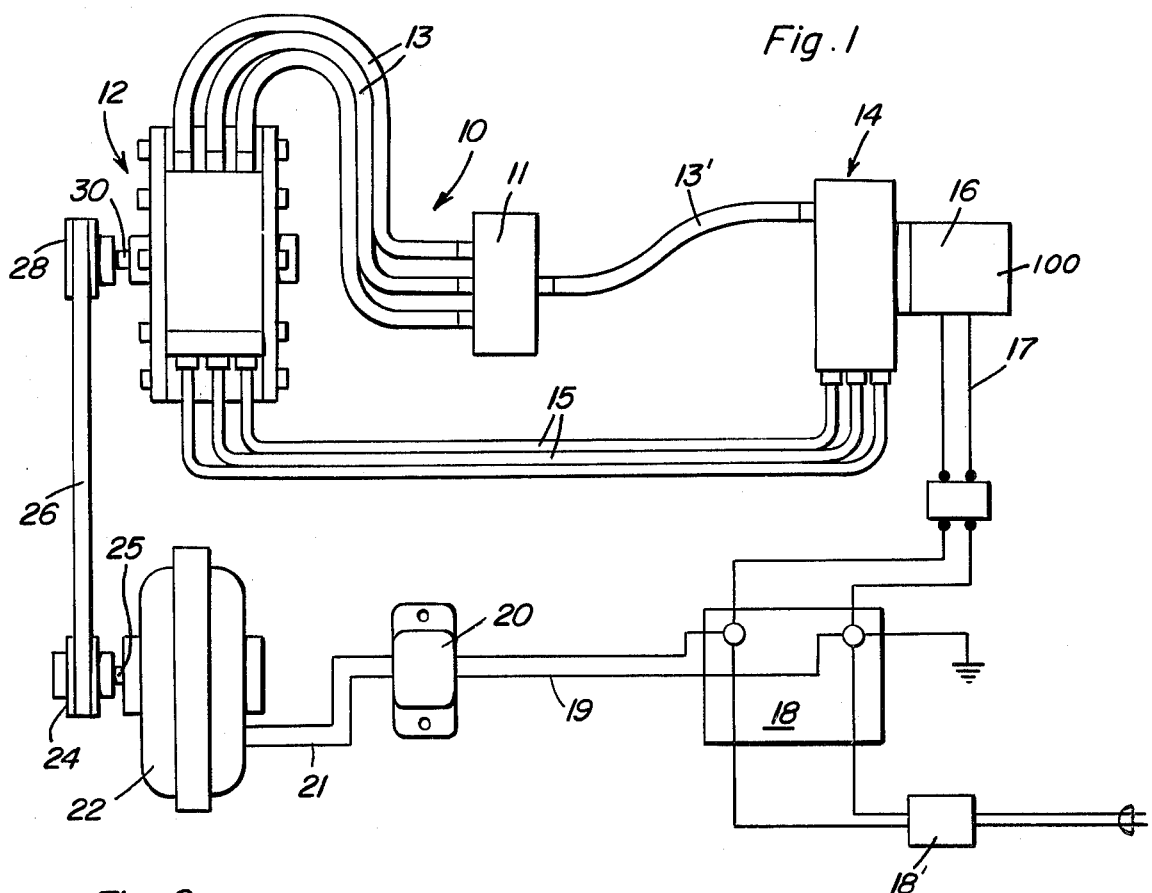
FIG. 1 is a schematic representation of the over-all hydraulic turbine engine and system of this invention.

Referring now to the drawings and particularly to FIG. 1, reference numeral 10 indicates the over-all system of the hydraulic turbine engine and related components. Reference numeral 12 indicates the hydraulic turbine engine itself. The hydraulic turbine engine is connected to a plurality of high pressure oil input lines 13 fed from a junction box 11 which is connected by a supply line 13' to mini-pack hydraulic pump and 15 gal. oil reservoir tank assembly 14 which supplies oil at approximately 3000 pounds per square inch through the line 13' into the box 11 and subsequently into the input of the turbine engine 12. Return lines 15 are provided from the discharge of the turbine engine 12 back to the hydraulic pump 14 as will be further described hereinafter. The hydraulic pump 14 is normally driven by an electric motor 16 which is connected by an appropriate electrical line 17 to a storage battery 18. Switch and motor control means 100 is provided in the electrical circuit in any convenient portion thereof. The storage battery 18 is normally charged by conventional battery charge means 18' and also is partially re-charged by a feedback circuit to be further described.

This feedback circuit includes a connecting cable 19, a voltage regulator 20, electrical cable 21, and an electrical alternator 22. The alternator 22 may be driven by any of several well-known mechanical arrangements connecting an output shaft 30 of the hydraulic turbine engine 12 and shaft 25 of the electrical alternator 22. A pulley 24 mounted on the shaft 25 is connected by a belt 26 to an output pulley 28 as indicated in FIG. 1. Obviously, any connective drive which is the mechanical equivalent of the arrangement shown can be used. The purpose of the feedback electrical system thus described is to permit the hydraulic turbine engine 12 to operate at a speed which will produce maximum output and maximum torque at maximum efficiency, while feeding back a portion of the useful output of the system 10 to the turbine engine 12 so that as much energy as possible can be conserved.

Figure 2:
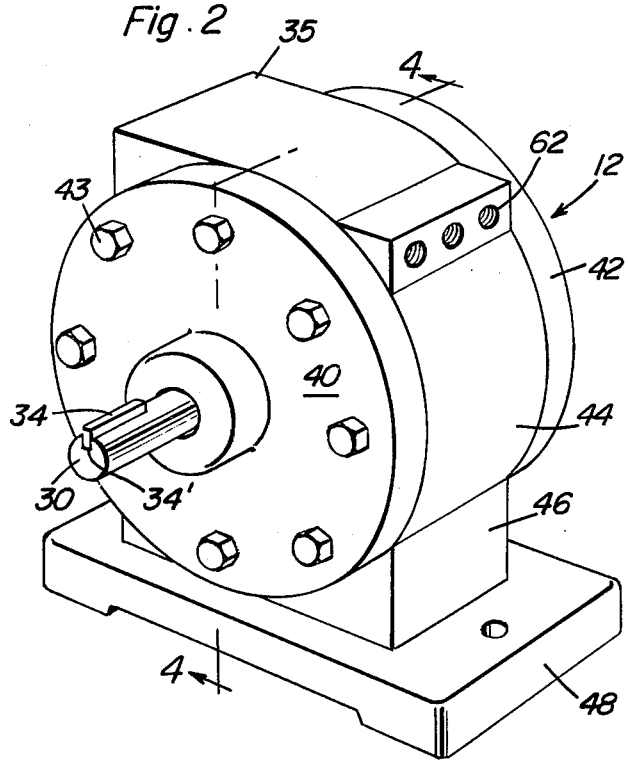
FIG. 2 is a perspective view of the hydraulic turbine engine per se.

Considering now FIGS. 2-7, the hydraulic turbine engine 12 of the invention will now be described. In FIG. 2, the heavy side discs 40 and 42 are seen to be mounted to either side of a main body member 44. Heavy bolts 43, provided with lock nuts 45, secure the discs 40 and 42 to the main body member 44. Gasket seals (not shown) can be used to prevent leakage through the joints between the discs 40, 42 and the member 44.

As best seen in FIGS. 3, 4, 5 and 7, a plurality of spaced input nozzles 60 are provided in an enlarged upper portion 35 of the main body member 44. The nozzles 60 are each connected to one each of the high pressure oil input lines 13. Each of the nozzles 60 further align with but do not directly communicate with output ports 62 formed in the enlarged upper portion 35, the ports 62 each being connected to one each of the return lines 15. Air vents 63 are provided in the main body member 44 (FIGS. 5 and 7) with one air vent being aligned with each of the notched discs 50 in order to prevent any pressure or vacuum build up between the outlet ports 62 and nozzles 60. The main body member 44 is mounted on a lower support portion 46 and a support stand 48. The support stand 48 has a recessed center portion 47, thereby providing the equivalent of legs at each end of the stand 48. The leg portions have apertures 49 provided therethrough so that the stand may be bolted to an over-all support structure, not shown.

Figure 4:
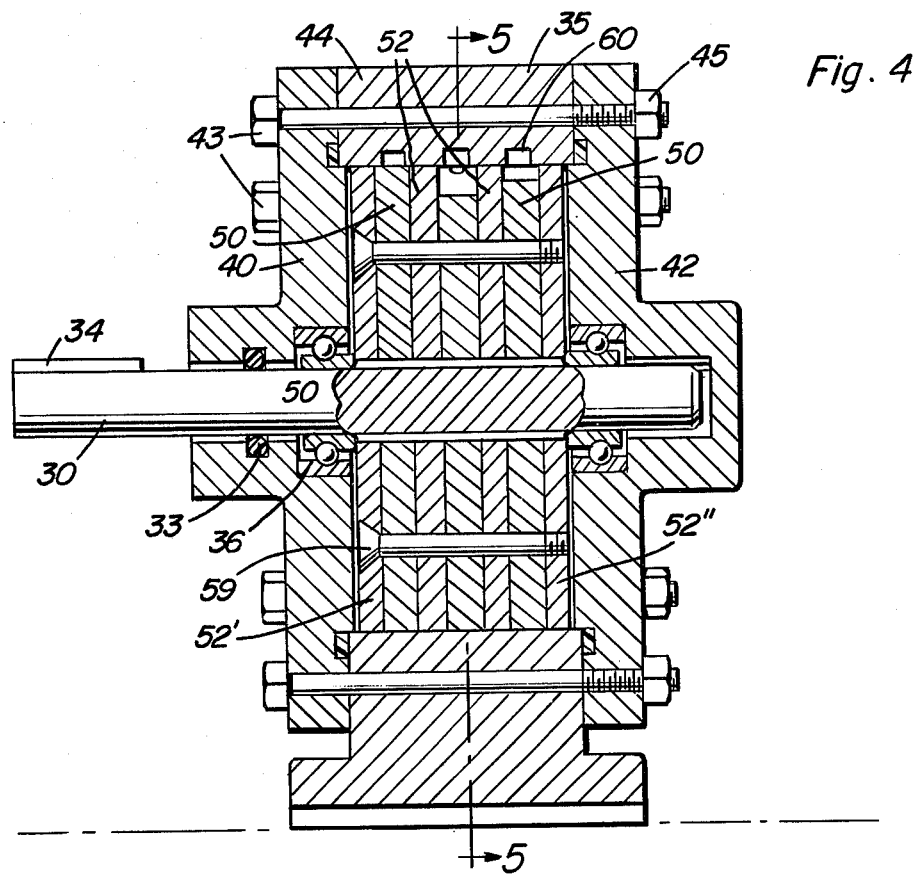
FIG. 4 is a cross-sectional view taken generally along section line 4—4 of FIG. 2.
Figure 5:
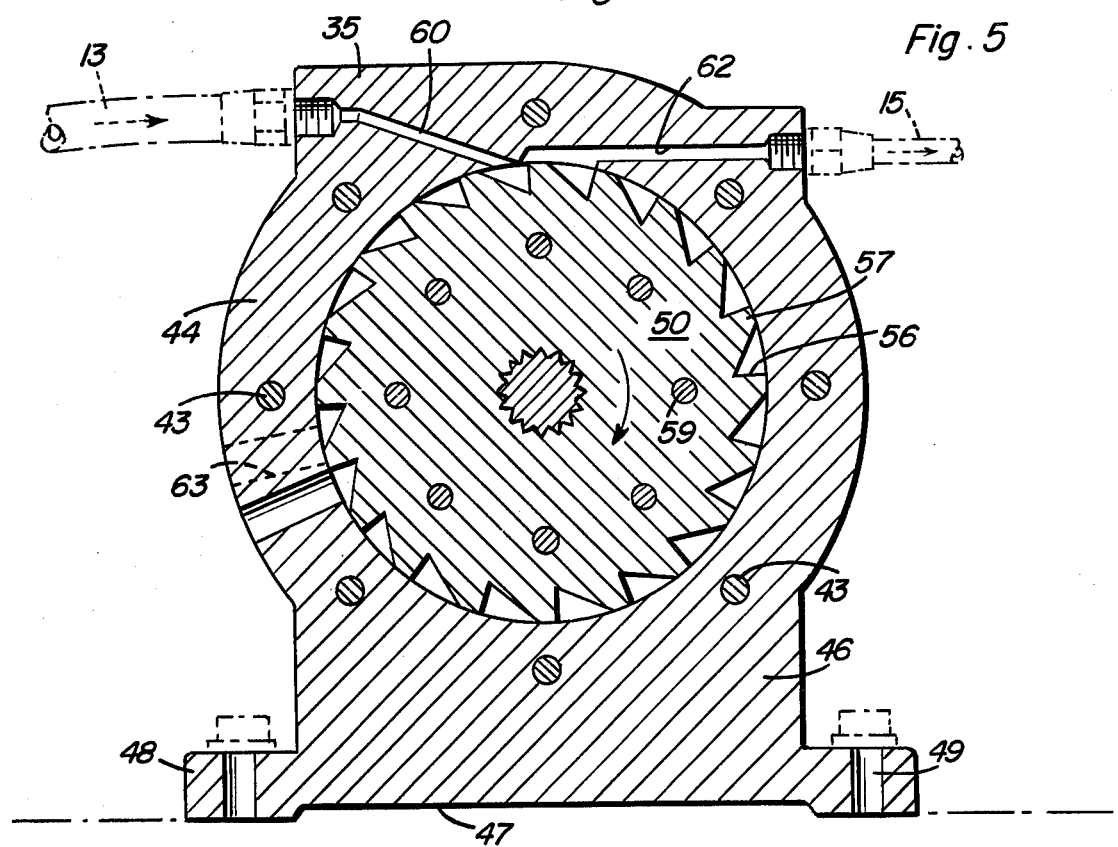
FIG. 5 is a cross-sectional view taken generally along section line 5—5 of FIG. 4.
Figure 6:
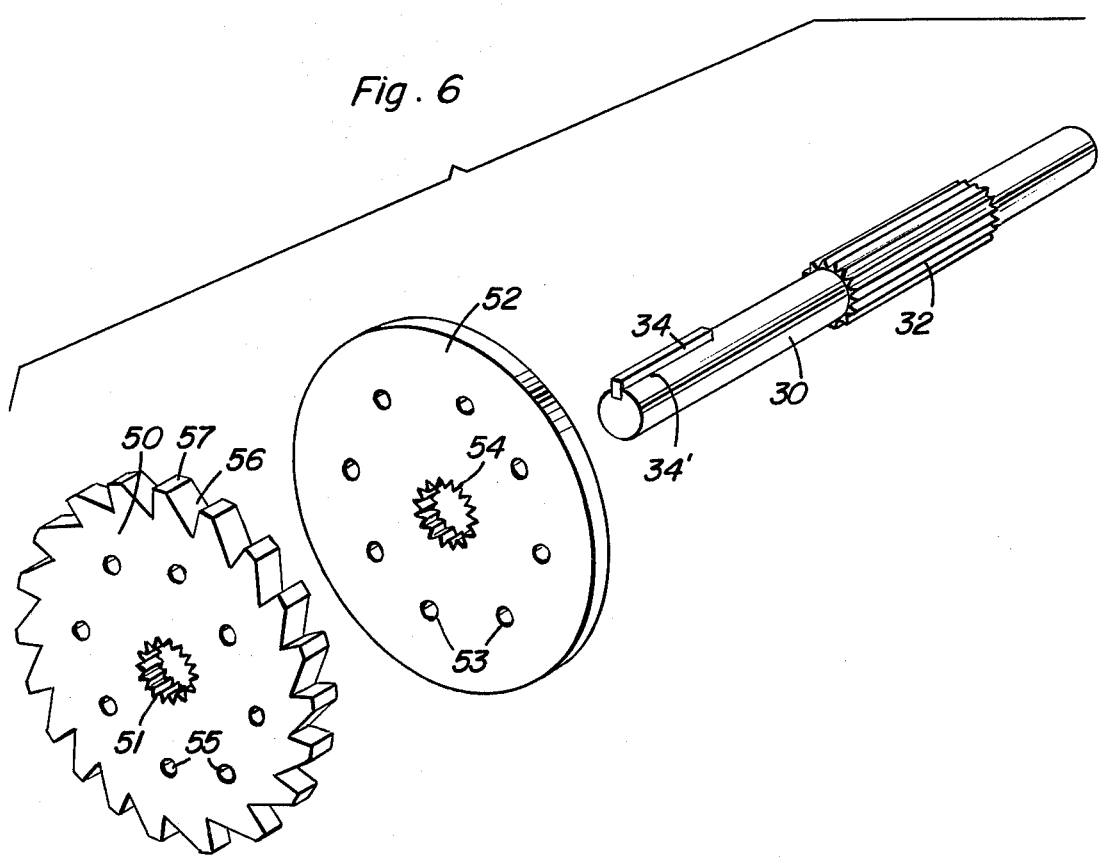
FIG. 6 is an exploded perspective view of one of the rotor drive plates, a separator disc, and the turbine drive shaft.
Figure 7:
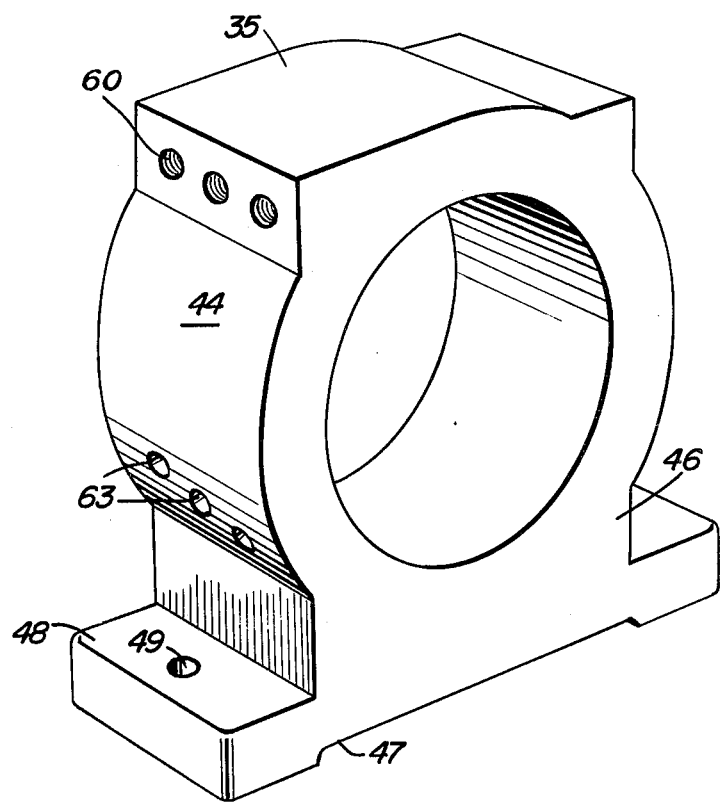
FIG. 7 is a perspective view of the turbine engine casing.

Referring now to FIGS. 4 and 6, the output shaft 30 is seen to be provided with a key slot 34' for reception of a key 34. Opposite ends of the shaft 30 are of the same diameter, each end being received and supported by a roller bearing 36 appropriately mounted in each of the two body discs 40 and 42. The output shaft 30 has a spline 32 formed in a central portion thereof for positive driving connection with the rotatable elements of the turbine engine 12. FIG. 4 also shows an O-ring 33 disposed about the shaft 30 for preventing any leakage of oil through or about said shaft 30 from internally of the engine 12.

Figure 3:
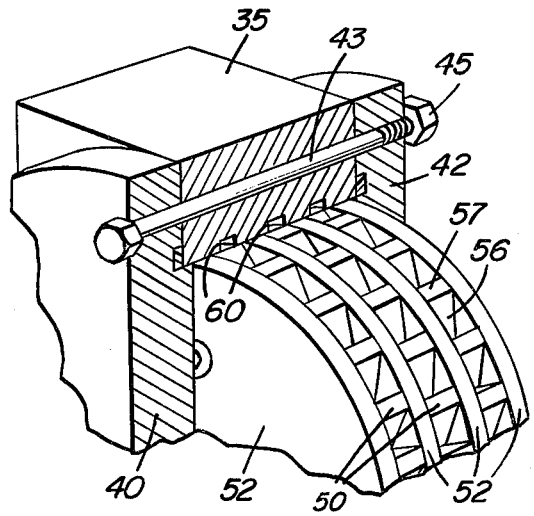
FIG. 3 is a cross-sectional view, in part, of the top portion of the turbine engine as depicted in FIG. 2.

The rotatable driving elements of the turbine engine 12 comprise plates or discs 50 having teeth 57 spaced evenly about the peripheries thereof, the teeth 57 being separated by and defining notches 56. Each of the rotatable discs 50 are preferably provided with 16 notches 56, the notches 56 being spaced 3.1416 inches apart in the outer circumferential edges of the discs 50, the discs 50 preferably having a diameter of 16 inches. Each notch 56 tapers from the outer circumference of the disc 50 to a depth of 1 inch at the radially innermost point thereof. The discs 50 are separated and sandwiched on either side by separator plates 52, the plates 52 being approximately one-half as thick as the discs 50. Each plate 50 has holes 53 spaced radially around the middle portion thereof at approximately an equal distance between an inner splined aperture 54 and the outer circumferential edge of said plate. The holes 53 in the plate 52 are located so as to align with holes 55 in the discs 50. The discs 50 also have splined aperture 51 provided therein. In the preferred embodiment of this invention, three of the discs 50 are normally provided, the discs 50 being separated and held together by four of the plates 52. As best seen in FIG. 4, the outer discs 52 differ in minor respects from the inner separator discs 52. The left or outer disc in FIG. 4 is indicated as 52' and the holes 53 in said disc are recessed for reception of a flanged head screw 59. The right outer disc 52" correspondingly has the holes 53 tapped with screw threads for engagement with the threads on the screw 59. Thus, the plurality of screws 59, spaced circumferentially about the output shaft 30, will hold the assembly of discs 50 and plates 52 positively together as one entity. The discs 50 further have their fastening holes 55 slightly shifted about the center line thereof so that the three discs 50 when assembled, as in FIG. 4, will have their notches 56 spaced and staggered from each other, rather than in direct alignment. FIG. 3 shows this arrangement in perspective.

Thus, as high pressure oil from the pump 14 is forced through the input lines 13 and through the nozzles 60, the oil will fill first one notch 56 in one disc 50 between two of the plates 52, then the next notch 56 of the adjacent disc 50, and then finally the notch 56 of the remaining disc 50, thereby providing a more even driving of the discs 50.

Oil entering the notches 56 will impinge on and exert force against facing walls of said notches, the oil then exiting through the output ports 62. The ports 62 overlap the upper open portions of the notches 56. The oil returns through the line 15 back to the pump 14. Each disc 50 is driven by pressurized fluid in one of the nozzles 60 and has an outlet port 62 adapted to provide an outlet path for the oil.

The mini-pack hydraulic pumping unit 14 as envisioned for use with the system 10 normally pumps 1.4 gallons per minute at a pressure of approximately 3000 pounds per square inch. Since it is driven by a direct current motor, a speed control rheostat can obviously be provided in the electrical control structure 100 in order to vary the over-all speed of the engine 12. Normally, the speed of the engine 12 will be set at the most efficient design speed, the system 10 being merely switched on and off, energy conservation being achieved by the feedback feature of the system 10.

As can be appreciated from the foregoing, the number of component parts of the hydraulic turbine engine 12 are relatively few in number. Further, the component parts of the system 10 are susceptible to mass production. In particular, the discs 50 are substantially similar, the only difference being in the spacing of the holes 55 relative to the notches 56 about the periphery thereof. Further, the plates 52 are also alike except for slight modification to the outer discs 52' and 52". The slight differences in the various components can be machined thereinto during the final finishing operation. Other components of the system 10 are conventional items which may be readily purchased and obtained through common commercial channels without great expense or difficulty. Thus, the hydraulic turbine engine 12 and system 10 as disclosed by this invention offers a new and novel power system to people in need of same without the usual complications and high cost.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed herein.

What is claimed as new is as follows:

1. An hydraulic turbine engine and motive power system, comprising:
    a main support structure;
    an output shaft mounted for rotation in said main support structure;
    at least three rotor discs mounted on and splined to the output shaft, each rotor disc having notches formed in and spaced regularly about the periphery thereof;
    spacer plates disposed on each side of each of the rotor discs, perimetric portions of the spacer plates forming side walls to partially enclose each of the notches on the sides thereof, the rotor discs being misaligned with each other to cause the notches in each disc to be offset relative to the notches in adjacent discs, a given notch in a given disc being forward of the adjacent notches in one adjacent disc and rearward of the adjacent notches in the other adjacent disc relative to the rotational sense of the output shaft;
    fluid input means for directing high pressure liquid against opposed surfaces of the notches of the rotor discs in order to impart a force against said surfaces of said notches, the fluid input means comprising an input nozzle disposed in the main support structure and arranged adjacent the outer circumferential edges of the spaced notches of each of the rotor discs;
    an exhaust output port disposed in the main support structure adjacent the outer circumferential edges of the spaced notches of each of the rotor discs and communicating therewith for receiving the liquid directed against said surfaces of the notches, one of the output ports being aligned with each one of the input nozzles, each output port communicating with one of the notches when the aligned input nozzle communicates therewith; and,
    feedback means arranged between the output shaft and the fluid input means for increasing the efficiency of the system.

2. The structure as set forth in claim 1, wherein the feedback means includes an alternator driven by the output shaft of the turbine engine, an electric motor for driving the fluid input means, and electrical connections between the alternator and the electric motor for supplying at least part of the energy for the electric motor from the output of the turbine engine to increase the over-all efficiency thereof.

* * * * *